(12) United States Patent
Kozak et al.

(10) Patent No.: US 6,386,621 B1
(45) Date of Patent: May 14, 2002

(54) REVERSE OPENING VEHICLE DOOR

(75) Inventors: Edward Thomas Kozak, Troy; James A. O'Brien, II, LaSalle, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,228

(22) Filed: Aug. 8, 2001

(51) Int. Cl.$^7$ .................................................. B60J 1/08
(52) U.S. Cl. ............. 296/155; 296/146.12; 296/146.11; 49/209; 49/223; 16/278
(58) Field of Search ........................ 296/146.12, 146.11, 296/155; 49/223, 219, 218, 216, 208, 209, 211, 212; 16/278, 250, 288

(56) References Cited

U.S. PATENT DOCUMENTS

| | | | |
|---|---|---|---|
| 2,039,130 A | * 4/1936 | Van Note | 16/278 |
| 2,937,043 A | 5/1960 | Griswold et al. | |
| 3,605,173 A | * 9/1971 | Lautenschlarger, Jr. | 16/250 |
| 4,502,182 A | * 3/1985 | Lautenschlager et al. | 16/288 |
| 4,700,984 A | * 10/1987 | Kinaga et al. | 296/146.11 |
| 4,771,508 A | * 9/1988 | Lautenschlager, Jr. | 16/370 |
| 4,930,836 A | * 6/1990 | Grinn | 296/146.11 |
| 5,398,988 A | 3/1995 | DeRees et al. | |
| 5,491,875 A | * 2/1996 | Siladke et al. | 296/190.11 |
| 5,632,065 A | 5/1997 | Siladke et al. | |
| 6,052,870 A | * 4/2000 | Hagenlocher et al. | 296/146.11 |
| 6,053,561 A | * 4/2000 | Hojnowski et al. | 296/146.11 |
| 6,196,617 B1 | * 3/2001 | Beck | 296/146.11 |
| 6,196,618 B1 | 3/2001 | Pietryga et al. | |
| 6,305,737 B1 | * 10/2001 | Corder et al. | 296/146.11 |
| 6,314,615 B1 | * 11/2001 | Wolda | 296/146.12 |
| 2001/0006298 A1 | * 7/2001 | Tsubokura et al. | 296/155 |

FOREIGN PATENT DOCUMENTS

DE         3814564 A1 * 11/1988 ........... E05D/15/10

* cited by examiner

Primary Examiner—Ken Patel

(57) ABSTRACT

A reverse opening vehicle door is provided (10), including a door body (16) having a fore portion (18) and an aft portion (20), a catch mechanism (50), and a hinge mechanism (70). The catch mechanism (50) and the hinge mechanism (70) permit the door body (16) to move between at least three positions including a closed position (22) having a fore closed position (30) and an aft closed position (32), an intermediate position (24) having an aft intermediate position (34) located outboard and rearward of the aft closed position (32) and a fore intermediate position (36) located rearward of the fore closed position (30), and an open position (26) in which the fore portion (18) is rotated rearward about the aft intermediate position (34).

39 Claims, 9 Drawing Sheets

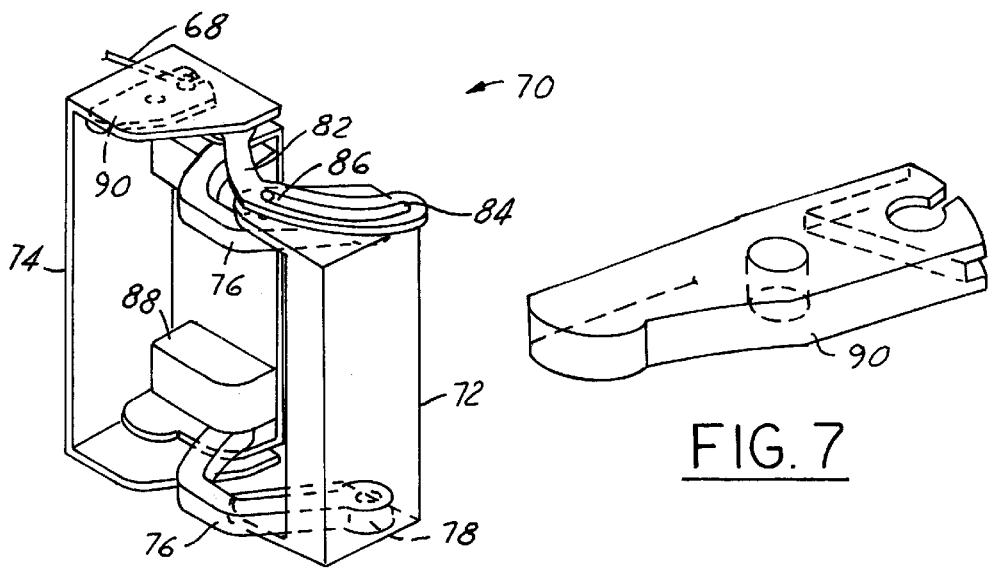
FIG. 5
FIG. 7
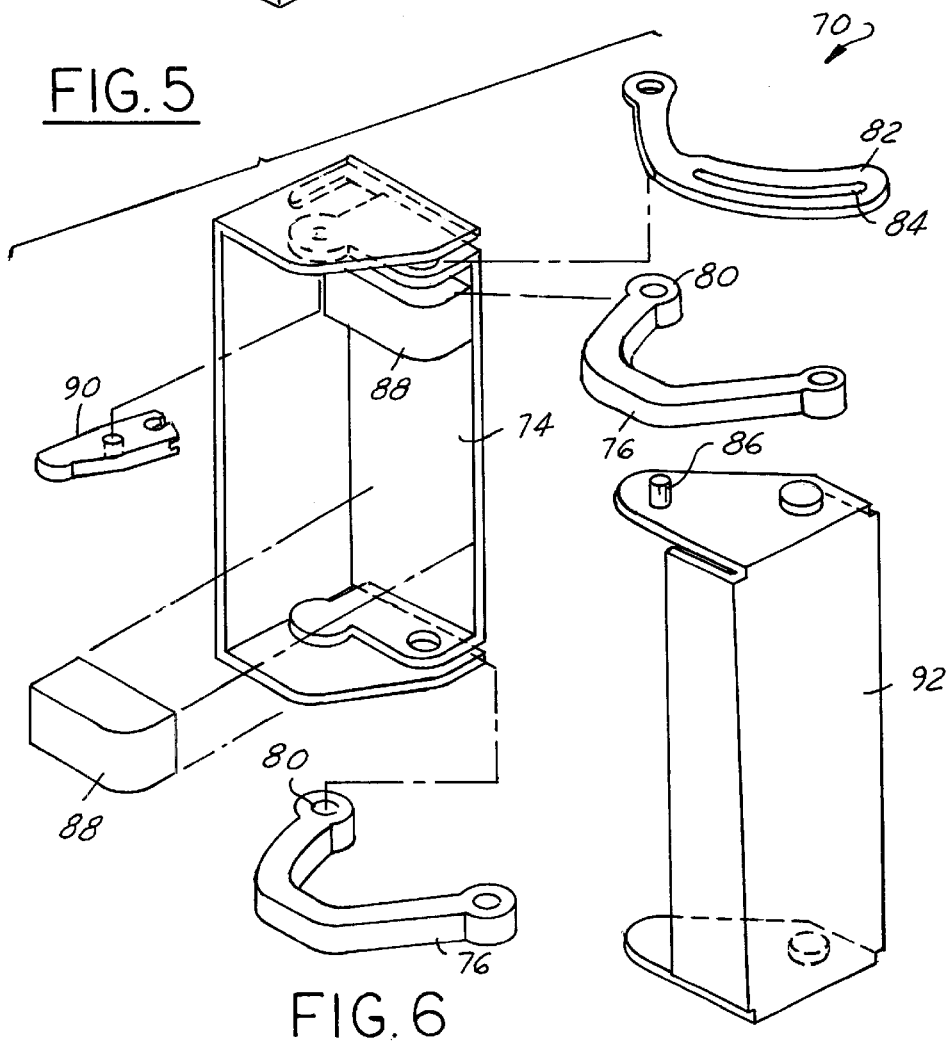
FIG. 6

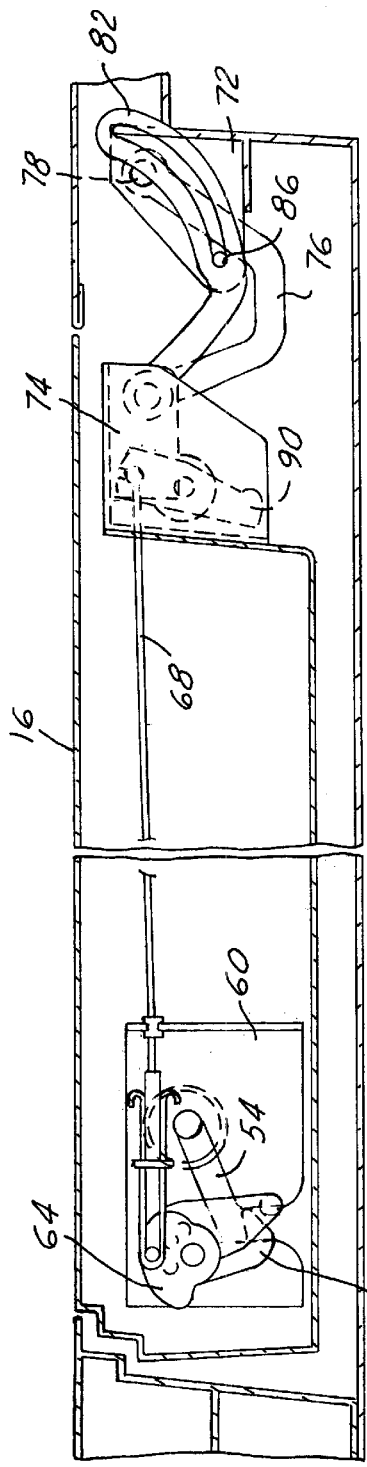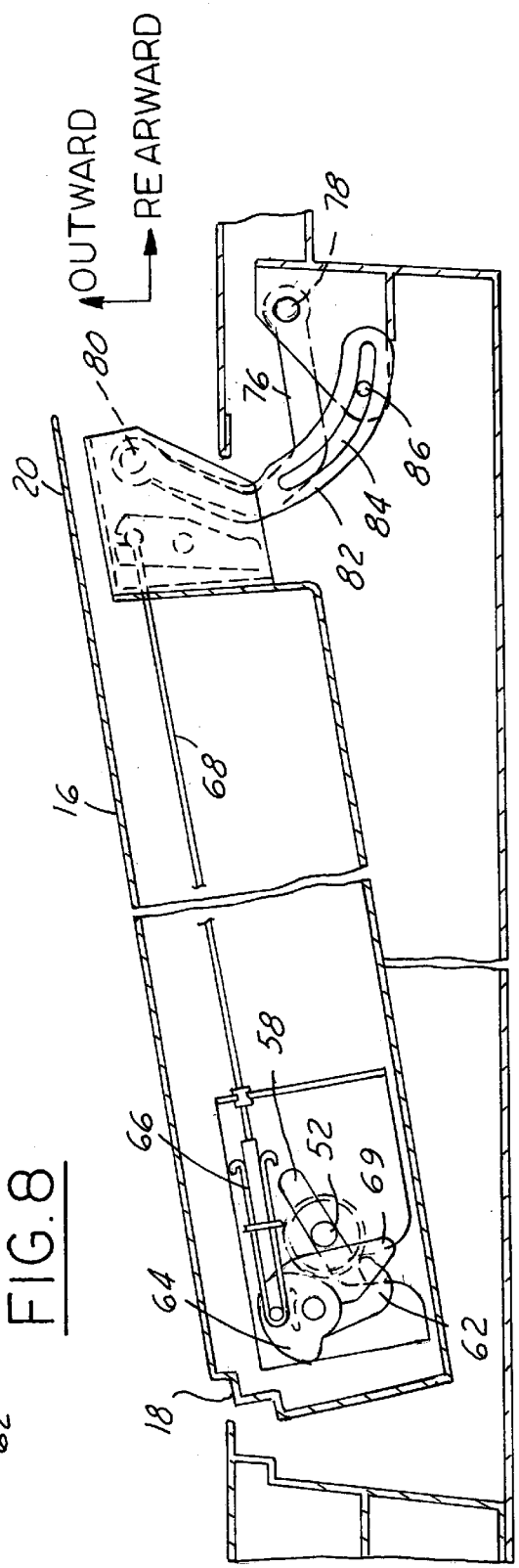
FIG. 8
FIG. 9

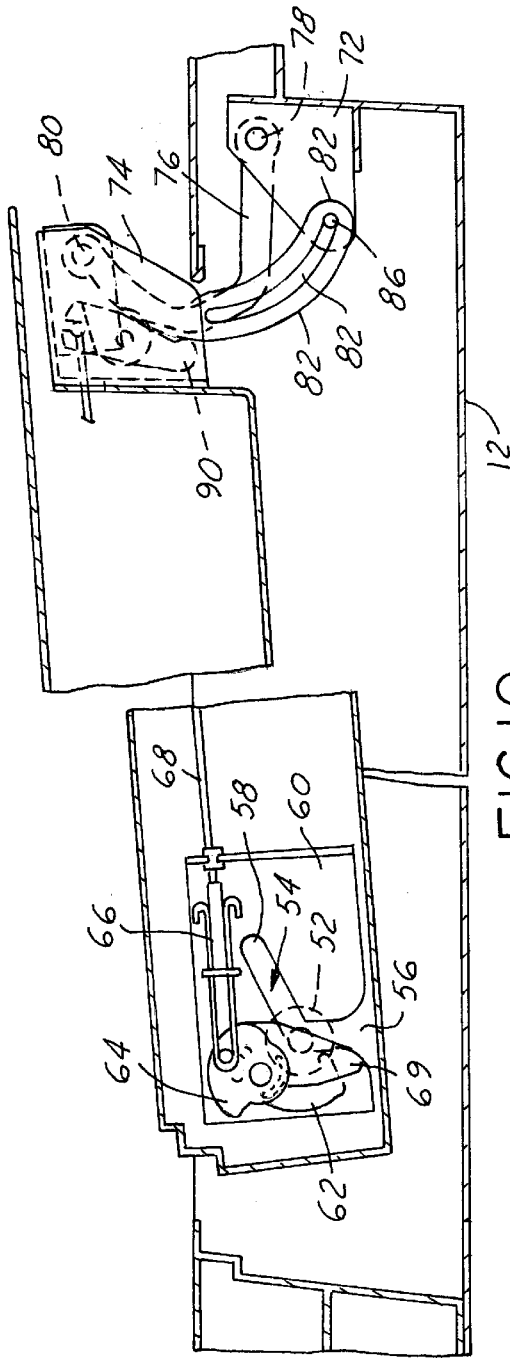
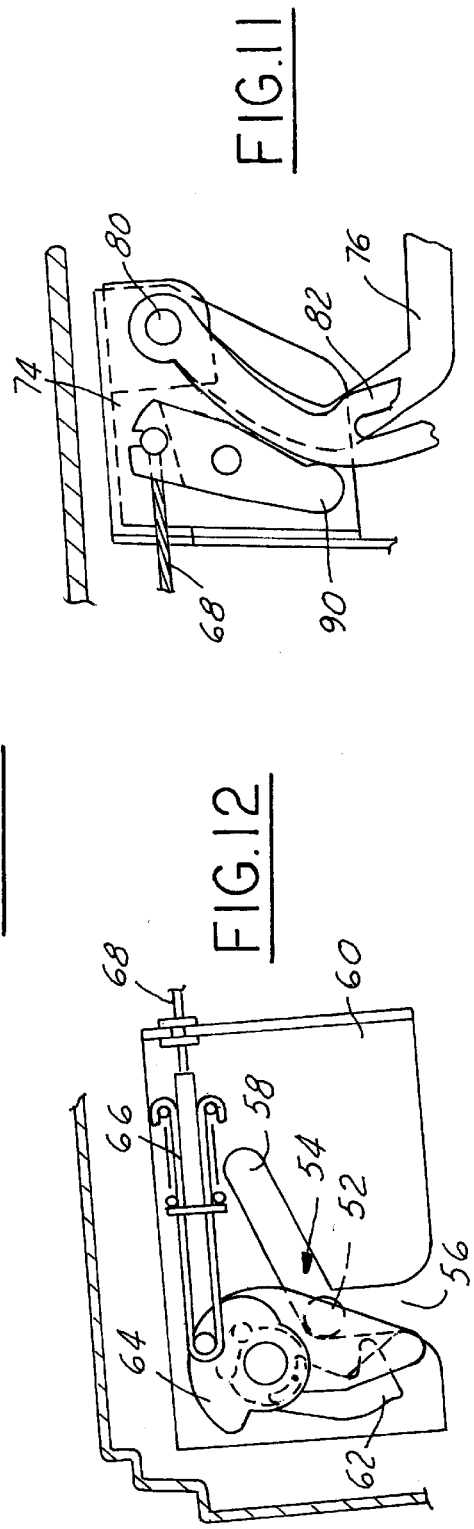

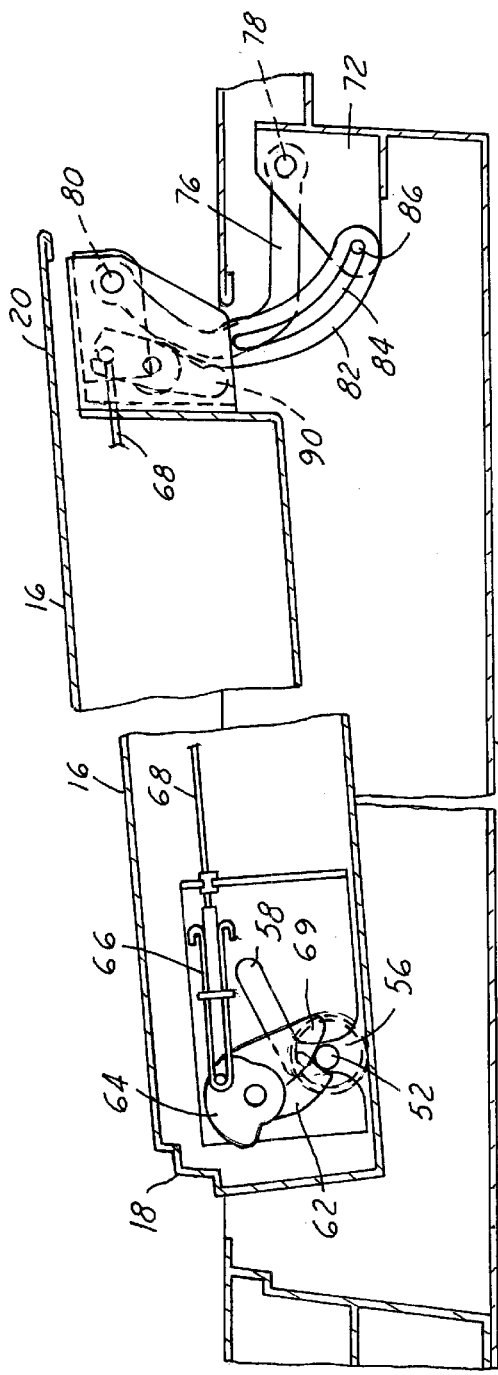
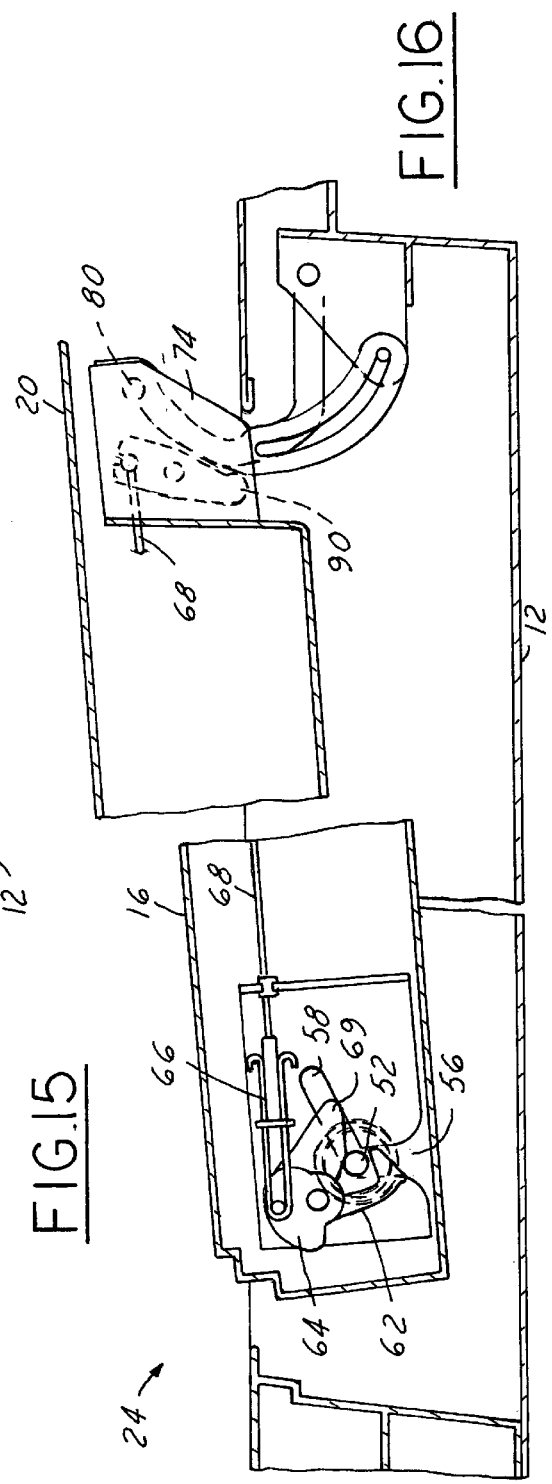

REVERSE OPENING VEHICLE DOOR

BACKGROUND OF INVENTION

The present invention relates generally to a reverse opening vehicle door and more particularly to a reverse opening vehicle door with improved appearance and independent function characteristics. The design and manufacture of automobile vehicles requires a variety of considerations. These considerations, including utility customers, customer convenience, and safety influence an ever growing portion of vehicle design. One such area of vehicle design subjected to such considerations involves the ingress and egress of the vehicle. Where once vehicle door assemblies primarily only varied in number, a growing number of vehicle doors with novel utility or operation have been developed.

One such non-standard door design involves the use of a reverse opening vehicle door. Reverse opening vehicle doors hold a long history in vehicle design. Early models were often simply mirrors of standard door designs and thereby required a pillar to be positioned between the front and rear doors. Although these designs could be noted for their simplicity, the existence of a pillar between the front and rear doors often hampered ingress and egress in the vehicle. Although they provided beneficial simplicity of use, the requirement of a pillar, and its corresponding inconvenience, can make this design unsuitable in many modern applications.

The interfering pillar was removed in some reverse opening vehicle door embodiments through the use of an overlapping front door. Designs with a front door that overlapped the leading edge of the reverse opening rear door provided benefits to the vehicle appearance by allowing for improved fit and finish. These appearance benefits, however, came at a cost. The overlapping front door commonly prevented the reverse opening rear door from operating independently. In these designs, the front door typically had to be opened before the reverse opening rear door could be utilized. This was inconvenient for a variety of reasons. Adults positioned within the rear of the vehicle could not open the reverse opening rear door and exit the vehicle without someone first opening the front door. In addition, entry and storage in the rear of the vehicle was awkward without independent functioning of the rear door.

One approach to providing independent function reverse opening vehicle door has been for the use of sliding vehicle doors. These doors allow for the improved appearance of overlapping front doors while providing independent function characteristics. Despite the benefits associated with sliding doors, they commonly carry with them a variety of detriments. Often tracks that control the movement of the sliding door, usurp valuable space within the vehicle. In addition, in some embodiments, both the tracks and pivots of the sliding door may be exposed and thereby create aesthetic disadvantages and consumer dissatisfaction. Finally, the design of sliding doors often does not allow them to provide unencumbered access to the vehicles. Often, these doors remain partially covering the vehicle opening and thereby hamper ingress and egress of the vehicle.

It would, therefore, be highly desirable to have a reverse opening vehicle door that did not require an interfering pillar, that retained the appearance benefits of an overlapping front edge, that provided independent function characteristics, and that operated without the detriments associated with sliding door models.

SUMMARY OF INVENTION

It is, therefore, an object of the present invention to provide a reverse opening vehicle door without the necessity of a pillar, that allows for front door overlap, that has independent function characteristics, and that does not necessitate complex tracking guides.

In accordance with the object of the present invention, a reverse opening vehicle door is provided. The reverse opening vehicle door includes a door body having a fore portion and an aft portion. The reverse opening vehicle door further includes a catch mechanism positioned on the fore portion of the door body and a hinge mechanism positioned on the aft portion of the door body. The catch mechanism and the hinge mechanism permit the door body to move between at least three positions. These positions include a closed position where the fore portion is in a fore closed position, and the aft portion is in an aft closed position. The three positions further include an intermediate position where the aft portion is in an aft intermediate position and the fore portion is in a fore intermediate position. The aft intermediate position is located outboard and rearward of the aft closed position, and the fore intermediate position is located rearward of the fore closed position. The at least three positions further includes an open position where the fore portion is rotated rearward about the aft intermediate position.

Other objects and features of the present invention will become apparent when viewed in light of the detailed description of the preferred embodiment when taken in conjunction with the attached drawings and appended claims.

BRIEF DESCRIPTION OF DRAWINGS

FIG. 5 is a detail of an embodiment of a hinge mechanism for use in the reverse opening vehicle door in accordance with the present invention;

FIG. 6 is an exploded view of the hinge mechanism illustrated in FIG. 5;

FIG. 7 is a detail of a catch release lever for use on the hinge mechanism illustrated in FIG. 5;

FIG. 8 is a cross-sectional view of an embodiment of the reverse opening vehicle door in accordance with the present invention, the reverse opening vehicle door illustrated in the closed position;

FIG. 9 is a cross-sectional view of an embodiment of the reverse opening vehicle door in accordance with the present invention, the reverse opening vehicle door illustrated in a position between a closed position and the intermediate position;

FIG. 10 is a cross-sectional view of an embodiment of the reverse opening vehicle door in accordance with the present invention, the reverse opening vehicle door illustrated in the intermediate position;

FIG. 11 is a detail of a portion of the hinge mechanism illustrated in FIG. 10, the detail illustrating the action of the catch release lever when the reverse opening vehicle door is moved from the closed position to the intermediate position;

FIG. 12 is a detail of a portion of the catch mechanism illustrated in FIG. 10, the detail illustrating the action of the catch mechanism elements when the reverse opening vehicle door is moved from the closed position to the intermediate position;

FIG. 15 is a cross-sectional view of an embodiment of the reverse opening vehicle door in accordance with the present invention, the reverse opening vehicle door illustrated in a closing sequence approaching the intermediate position from the open position;

FIG. 16 is a cross-sectional view of an embodiment of the reverse opening vehicle door in accordance with the present invention, the reverse opening vehicle door illustrated engaging the striker during a closing sequence;

DETAILED DESCRIPTION

Figure 1:
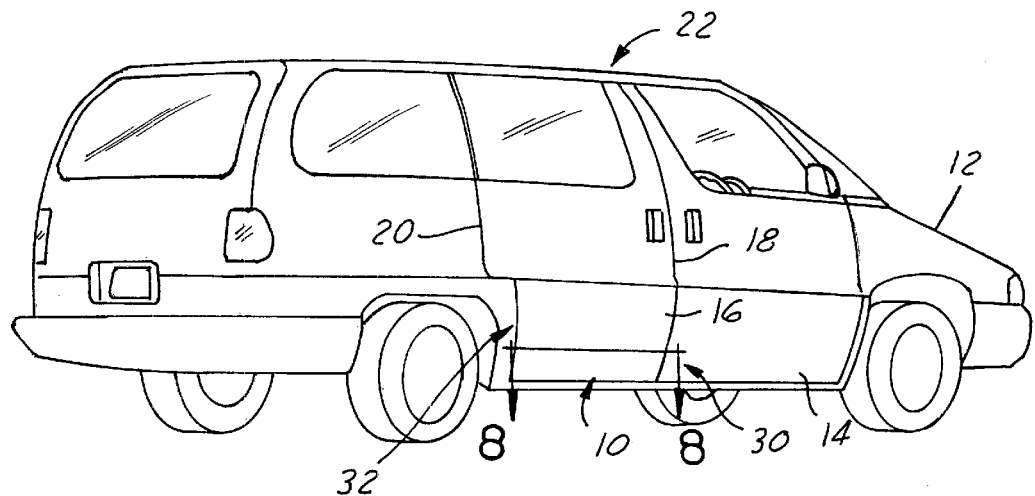
FIG. 1 is an illustration of an embodiment of a reverse opening vehicle door in accordance with the present invention, the reverse opening vehicle door shown mounted on a vehicle in the closed position.

Referring now to FIG. 1 which is an illustration of a reverse opening vehicle door 10 in accordance with the present invention. The reverse opening vehicle door 10 is illustrated mounted on a vehicle 12 behind a standard opening front door 14. It should be understood that although a particular vehicle 12 and a particular position are illustrated, a reverse opening vehicle door 10 is intended for use in a variety of vehicles, a variety of positions, and for a variety of applications.

The reverse opening vehicle door 10 includes a door body 16 having a fore portion 18 and an aft portion 20. The door body 16 is movable between at least three positions, including a closed position 22, an intermediate position 24, and an open position 26 (see FIG. 2). While in the closed position 22, the fore portion 18 is in a fore closed position 30 and the aft portion 20 is in an aft closed position 32.

Figure 2:
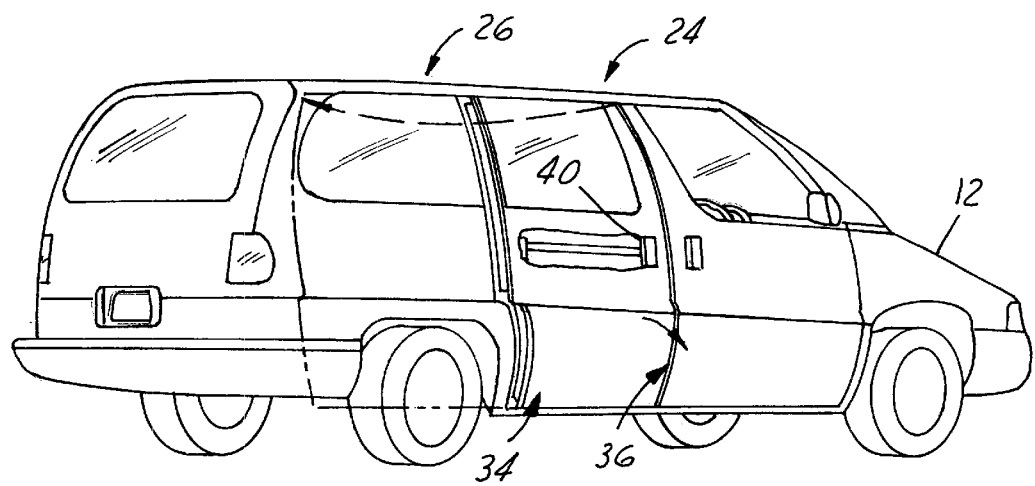
FIG. 2 is an illustration of an embodiment of a reverse opening vehicle door in accordance with the present invention, the reverse opening vehicle door shown mounted on a vehicle in both the intermediate and open positions.

Referring now to FIG. 2 which is an illustration of the reverse opening vehicle door 10 illustrated mounted on a vehicle 12 and illustrating both the intermediate position 24 as well as the open position 26. Upon opening the reverse opening vehicle door 10, the door body 16 is moved from the closed position 22 to the intermediate position 24. The aft portion 20 moves from the aft closed position 32 to an aft intermediate position 34. The aft intermediate position 34 is located outboard and rearward of the aft closed position 32. The fore portion 18 also moves from a fore closed position 30 to a fore intermediate position 36. The fore intermediate position 36 is located rearward of the fore closed position 30. By utilizing this intermediate position 24, the present invention allows a reverse opening vehicle door 10 to move from a closed position 22 that is compatible with an overlap from the front door 14 to an intermediate position 24 where the door body 16 is in a position capable of being swung open in a traditional fashion away from the vehicle 12 without interference from the front door 14 into an open position 26'.

The door body 16 is further movable from the intermediate position 24 to an open position 26. In the open position 26, the fore portion 18 is rotated rearward about the aft intermediate position 34. Although the door body 16 is illustrated rotated rearward until flush with the vehicle 12, it is contemplated that the door body 16 may be limited to specific rotations, or specific groups of rotations, in different embodiments. It should be understood that the present invention may further include a latch element 40 positioned on the door body 16 in order to retain the door body 16 in the closed position 22 as well as effectuate its movement into the intermediate position 24 and open position 26 or by the vehicle occupant. The manufacturing, design and use of vehicle handles 40 is well known in the prior art and its description is not intended as a limitation of the present invention.

Figure 3:
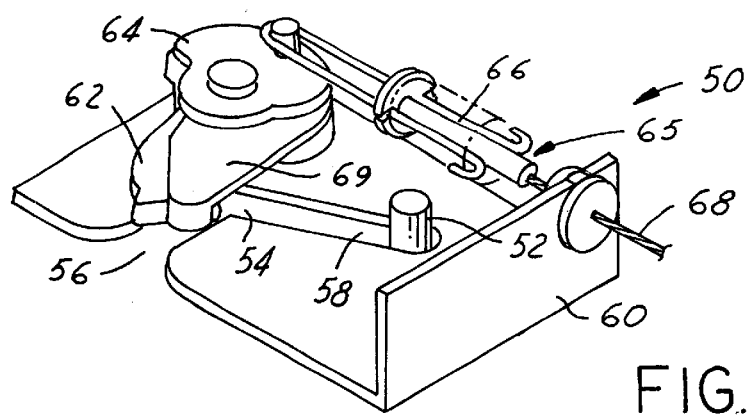
FIG. 3 is a detail of an embodiment of a catch mechanism for use in the reverse opening vehicle door in accordance with the present invention.

Although the mechanisms for effectuating a reverse opening vehicle door 10 with at least three positions as described may be accomplished utilizing a variety of specific mechanisms, in one embodiment the reverse opening vehicle door 10 includes a catch mechanism 50 (see FIG. 3). The catch mechanism 50 is intended for use with a striker 52 mounted on the vehicle 12. The catch mechanism 50 includes a catch path 54 having a receiving portion 56 and a travel portion 58. The catch mechanism 50 mounted on the vehicle door 16 utilizes a receiving portion 56 to allow the catch mechanism 50 to engage the striker 52 from an inboard/outboard direction. This allows the door body 16 to engage the striker 52 or disengage the striker 52 when rotated shut from the open position 26 to the intermediate position 24 or open from the intermediate position 24 to the open position 26. In this fashion, the reverse opening vehicle door 10 may be moved back and forth from these positions in a manner consistent with standard door operation. The catch mechanism 50, however, further includes the travel portion 58 that allows the door body 16 to move fore and aft relative to the vehicle 12 while continuing to engage the striker 52. This allows the door body 16 to be shifted fore and aft to accommodate an overlapping front door 14 and without requiring a pillar (not shown).

Figure 4:
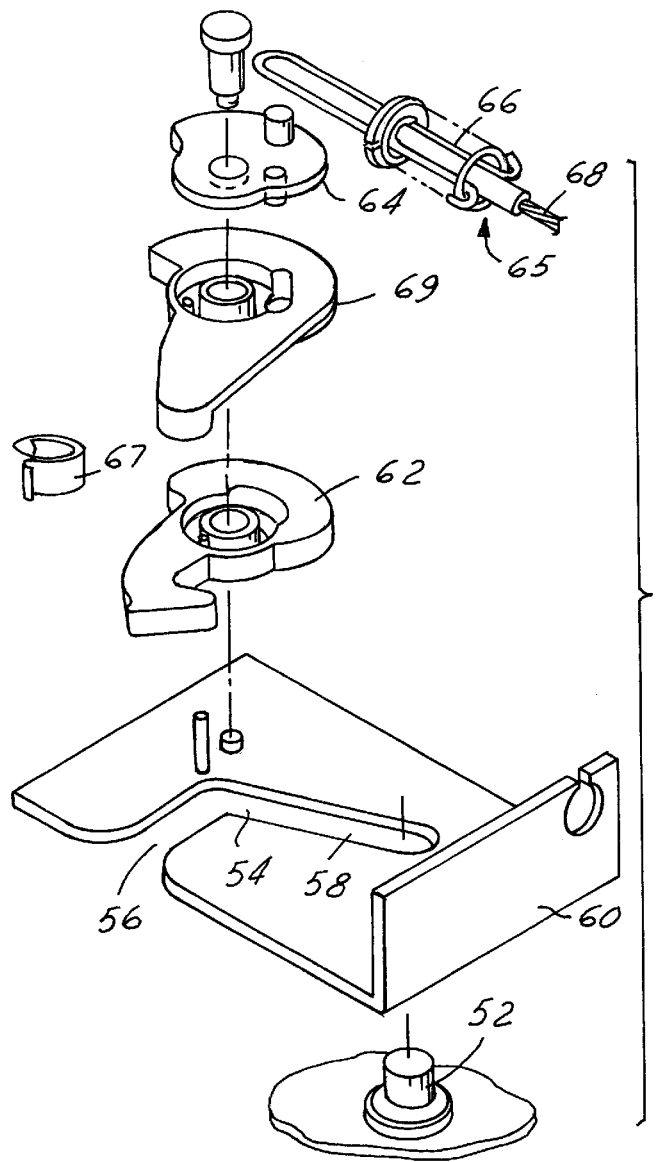
FIG. 4 is an exploded view of the catch mechanism illustrated in FIG. 3.
Figure 13:
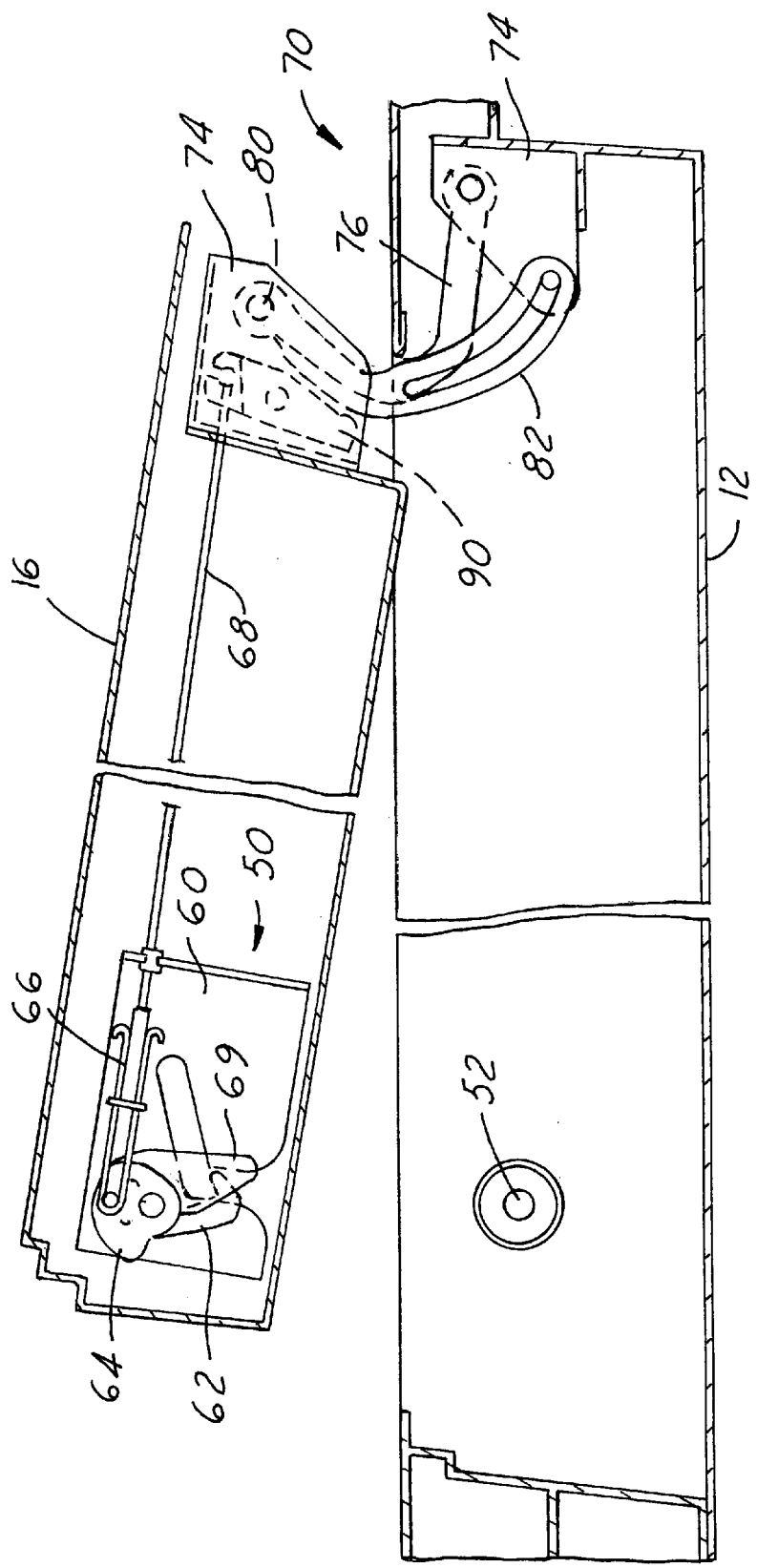
FIG. 13 is a cross-sectional view of an embodiment of the reverse opening vehicle door in accordance with the present invention, the reverse opening vehicle door illustrated in a position between the intermediate position and the open position.

Although the catch mechanism 50 is contemplated to take on a variety of forms, one embodiment is illustrated in FIGS. 3 and 4. In this embodiment, the catch mechanism 50 includes a base element 60 shaped to form the catch path 54. In addition, the catch mechanism further includes an open catch element 62. The open catch element 62 insures the door body 16 is held to the vehicle 12 until the aft portion 20 is securely in the aft intermediate position 34. In addition, when the door body 16 is moved from the open position 26' to the intermediate position 24, the open catch element 62 prevents the door body 16 from bouncing open if slammed shut. In this embodiment, the open catch element 62 is released to allow the door body 16 to open when the door body 16 reaches intermediate position 24 through the use of a mode cam 64 in communication with a hinge mechanism 70 (see FIG. 5) by way of linkage element 65. Although a variety of linkages 65 are contemplated, in one embodiment the linkage 65 includes a spring element 66 and a cable 68. The catch mechanism 50 may also include a closed cam 69 that operates in conjunction with the mode cam 64 during impact with the striker 52 to exert a closing force on the door body 16. Biasing springs 67 may be utilized between the mode cam 64, the closed cam 69, and the open catch element 62, although their use is not required. Although in one embodiment the catch mechanism 50 acts in concert with the hinge mechanism 70 (see FIG. 5), it is contemplated that the catch mechanism 50 with unique catch path 54 in alternate embodiments may be utilized independently of the hinge mechanism 70.

It is contemplated that a wide variety of hinge mechanisms 70 may be utilized in order to allow the aft portion 20 of the door body 16 to move from an aft closed position to an aft intermediate position located outboard and rearward of the aft closed position. In addition, the hinge mechanism 70 should at that stage allow the door body 16 to rotate about the aft intermediate position 34 to allow the door body 16 to be swung out into an open position 26'. Although a variety of embodiments are contemplated to accomplish this functionality, one embodiment of a hinge mechanism 70 is illustrated in FIGS. 5–7. The hinge mechanism 70 includes a first mounting structure 72 for mounting on the vehicle 12 and a second mounting structure 74 for mounting on the door body 16. The hinge mechanism 70 also includes at least one rotating pivot arm 76 connecting the first mounting structure 72 to the second mounting structure 74. The rotating pivot arm 76 rotates about a first fixed pivot position 78 and is formed to allow the second mounting structure 74 attached in close proximity to the aft portion 20 to move outboard and rearward of the vehicle 12 when the rotating pivot arm 76 is rotated. Although the rotating pivot arm 76 may take on a variety of forms, in one embodiment the rotating pivot arm 76 is generally arch shaped. The rotating pivot arm 76 allows the rear portion 20 of the door body 16 to be moved from the aft closed position 32 to the aft intermediate position 34. In addition, the rotating pivot arm 76 also includes a first free pivot position 80 located in communication with the second mounting structure 74. A first free pivot position 80 allows the second mounting structure 74 along with the door body 16 to pivot about the aft intermediate position 34 and allows the door body 16 to be swung open into the open position 26'. In addition, the hinge mechanism 70 may also include a control pivot arm 82 that stops the rotating pivot arm 76 from rotating about the first fixed pivot position 78 once the door body 16 has reached the intermediate position 24. Although it is contemplated that the control pivot arm 82 may take on a variety of forms, in one embodiment the control pivot arm 82 includes the control track 84 that is in communication within control pin 86 mounted on the first mounting structure 72. The control pin 86 travels within the control track 84 and serves to limit the travel of the rotating pivot arm 76 such that the rotating pivot arm 76 becomes locked when it reaches the intermediate position 24. The hinge mechanism 70 may additionally include other mechanisms, such as door stop 88. Door stops 88 are well known in the prior art and are used to allow the door body 16 to be restrained in a number of positions without swinging shut. Although it is contemplated that the hinge mechanism 70 may be utilized independently of the catch mechanism 50 or may be used with alternate mechanisms for controlling the fore portion 18 of the door body 16, in at least one embodiment, the present invention contemplates that the hinge mechanism 70 and the catch mechanism 50 may act in concert.

Figure 14:
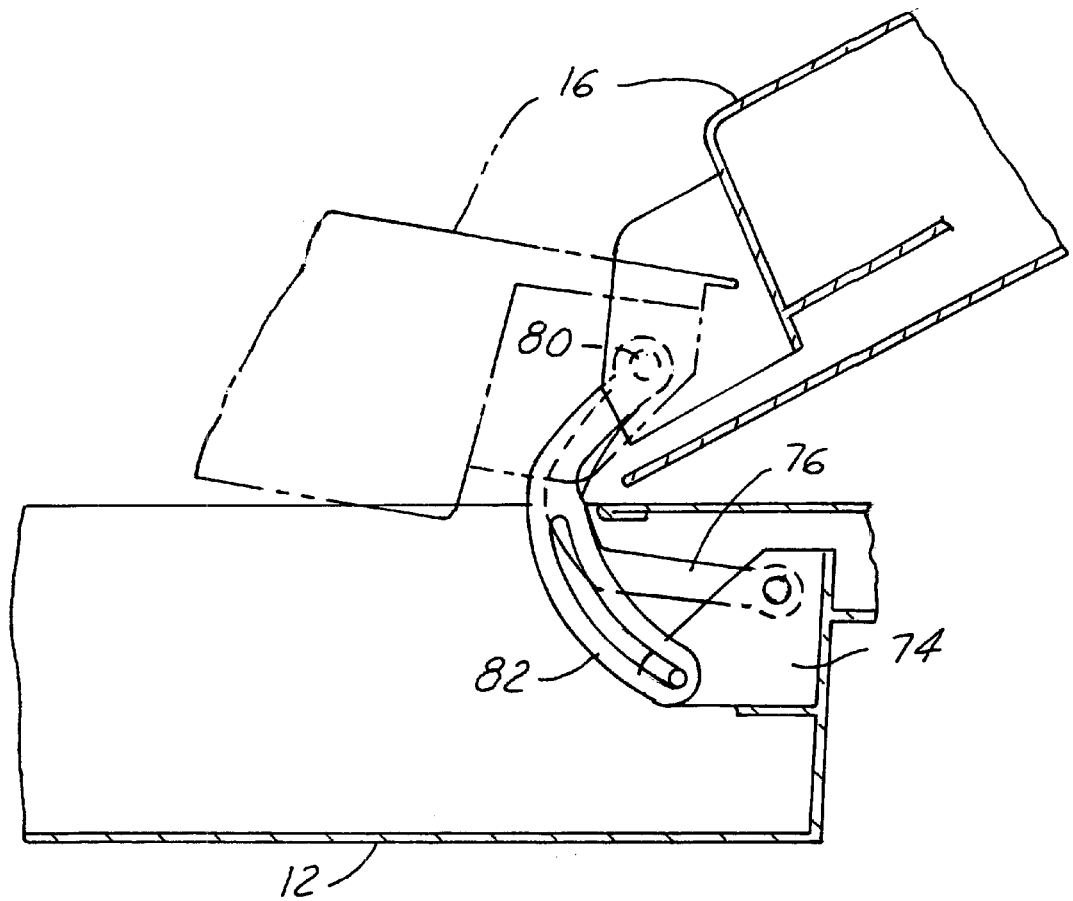
FIG. 14 is a detail of the reverse opening vehicle door shown in FIG. 13, the detail illustrating the motion of the reverse opening vehicle door as it moves towards the open position.

Although the hinge mechanism 70 and the catch mechanism 50 may operate in concert through a variety of methods, in one embodiment, the communication is accomplished through a catch release lever 90 mounted on the second mounting structure 74. The cable 68 attached to the spring element 66 and the mode cam 64 (see FIG. 4) attaches to the catch release lever 90 to facilitate communication between the catch mechanism 50 and the hinge mechanism 70. FIGS. 8–14 illustrate the communication between the catch mechanism 50 and the hinge mechanism 70 during the opening and closing of the door body 16. FIG. 8 illustrates a cross-sectional view of the door body 16 illustrating the catch mechanism 50 and the hinge mechanism 80 while the door body 16 is in the closed position 22. When the door body 16 is starting an opening sequence (see FIG. 9), the aft portion 20 of the door body 16 begins to move outboard and rearward of the aft closed position 32 as the rotating pivot arm 76 rotates about the first fixed pivot position 78. As it does so, the fore portion 18 of the door body 16 moves rearward and the striker 52 mounted on the vehicle 12 moves through the travel portion 58 of the catch mechanism 50 towards the receiving portion 56. When the door body 16 reaches the intermediate position 24 (see FIG. 10), the rotating pivot arm 76 is stopped when the control pin 86 comes into contact with the end of the control track 84 in the with the rotating pivot arm 76 (see FIG. 11) and thereby exerts a force on the cable 68 which in turn pulls the spring element 66 and moves the mode cam 64 on the catch mechanism 50 (see FIG. 12). The mode cam 64 in turn moves the open catch element 62 out of the way of the striker 52 allowing the door body 16 to be swung outboard and free of the striker 52 (see FIG. 13). The door body 16 is then allowed to rotate about the first free pivot position 80 allowing the door body 16 to be swung into the open position 26 in a conventional door opening operation. FIG. 14 further illustrates the door body 16 rotating from the intermediate position 24 towards an open position 26.

Figure 17:
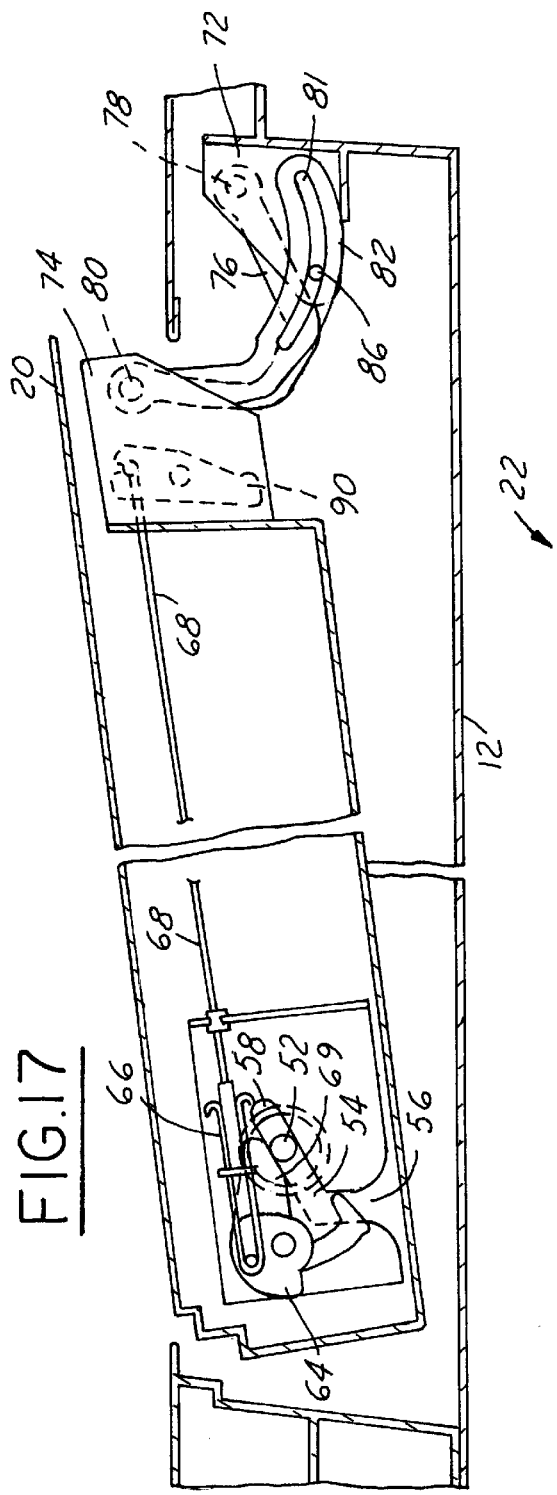
FIG. 17 is a cross-sectional view of an embodiment of the reverse opening vehicle door in accordance with the present invention, the reverse opening vehicle door illustrated moving from the intermediate position to the closed position during a closing sequence.
Figure 18:
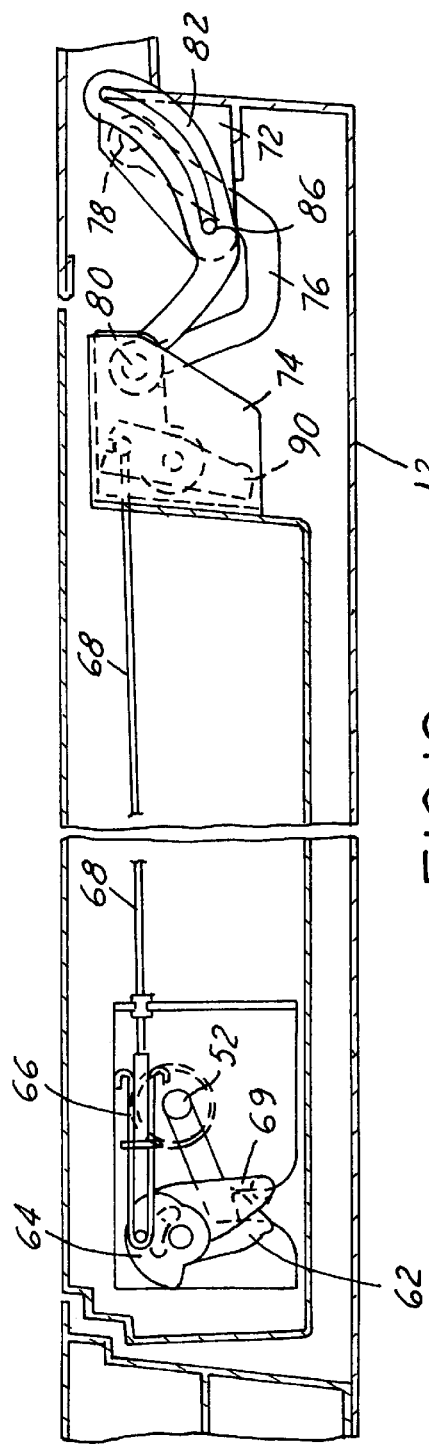
FIG. 18 is a cross-sectional view of an embodiment of the reverse opening vehicle door in accordance with the present invention, the reverse opening vehicle door illustrated in the closed position.

In an alternate embodiment, it is contemplated that the catch mechanism 50 and the hinge mechanism 70 act in concert during closing of the door body 16 as well as during the opening operation. In FIG. 15, the door body 16 has been swung shut from the open position 26' towards the intermediate position 24. As the door body 16 swings shut rotating about the first free pivot position 80, the receiving portion 56 with the catch patch 54 comes into contact with the striker 52. In doing so, the open catch element 62 is pushed out of the path of the striker 52 in a clockwise direction while the closed cam 69 is rotated counterclockwise. It should be noted that the directions clockwise and counterclockwise are strictly for illustrative purposes. The open catch element 62 moves back into position after the striker 52 passes it to prevent the door body 16 from bouncing open if slammed. The closing cam 69 as it rotates counterclockwise moves the mode cam 64, imparting a force on the spring element 66 and cable 68 that in turn causes the catch release lever 90 to impact the rotating pivot arm 76 (see FIG. 16). This can be used to prompt the rotating pivot arm 76 to rotate back towards the vehicle 12 and for the aft portion 20 of the door body 16 to move naturally from the intermediate position 24 back into the closed position 22 (see FIGS. 17 and 18). This simple communication between the catch mechanism 50 and the hinge mechanism 70 allows the door body 16 to be opened and closed simply and without the requirement for automated electronic or mechanical mechanisms. In this fashion, the present invention provides an efficient, cost effective reverse opening vehicle door 10 with improved operation.

While particular embodiments of the invention have been shown and described, numerous variations and alternative embodiments will occur to those skilled in the arm. Accordingly, it is intended that the invention be limited only in terms of the appended claims.

What is claimed is:

1. A reverse opening vehicle door for use within a door opening of a vehicle, the door opening including a striker positioned on the vehicle, comprising:
   a door body having a fore portion and an aft portion;
   a catch mechanism positioned on the fore portion of said door body;
   a hinge mechanism positioned on the aft portion of said door body;
   said catch mechanism and said hinge mechanism permitting said door body to move from a closed position wherein said fore portion is in a fore closed position and said aft portion is in an aft closed position to an intermediate position wherein said aft portion is in an aft intermediate position located outboard and rearward of said aft closed position and said fore portion is in a fore intermediate position located rearward of said fore closed position; and
   said catch mechanism and said hinge mechanism permitting said fore portion of said door body to rotate about said aft intermediate position to move said door body from said intermediate position to an open position.

2. A reverse opening vehicle door as described in claim 1 wherein said hinge mechanism includes at least one rotating pivot arm including a first fixed pivot position and a first free pivot position.

3. A reverse opening vehicle door as described in claim 2 wherein said at least one rotating pivot arm is generally arc shaped.

4. A reverse opening vehicle door as described in claim 2 wherein said hinge mechanism includes at least one control pivot arm capable of stopping the travel of said at least one rotating pivot arm when said door body reaches said intermediate position.

5. A reverse opening vehicle door as described in claim 4 further comprising:
   a control track located within said at least one control pivot arm; and
   a control pin positioned within said control track, said control pin stopping the travel of said at least one control pivot arm when said door body reaches said intermediate position.

6. A reverse opening vehicle door as described in claim 2 further comprising:
   a first mounting structure capable of being mounted on the vehicle; and
   a second mounting structure mounted on said door body;
   wherein said at least one rotating pivot arm is rotatably mounted to said first mounting structure at said first fixed pivot position and is rotatably mounted to said second mounting structure at said first free pivot position.

7. A reverse opening vehicle door as described in claim 2 further comprising:
   at least one door stop.

8. A reverse opening vehicle door as described in claim 4 wherein said at least one control pivot arm is generally arc shaped.

9. A reverse opening vehicle door as described in claim 1 further comprising:
   an open catch element preventing said catch mechanism from disengaging the striker unless said door body is in said intermediate position.

10. A reverse opening vehicle door as described in claim 1 wherein said catch mechanism includes a catch path having a receiving portion and a travel portion;
    said receiving portion allowing said catch mechanism to engage the striker from an outboard/inboard direction; and
    said travel portion allowing said door body to move, while engaging the striker, in a fore/aft direction.

11. A reverse opening vehicle door as described in claim 10 wherein said receiving portion is positioned generally perpendicular to the plane of the door opening; and said travel portion is positioned generally parallel to the plane of the door opening.

12. A reverse opening vehicle door as described in claim 10 wherein said catch path is formed into a base element.

13. A reverse opening vehicle door as described in claim 1 wherein said hinge mechanism and said catch mechanism are in communication, said hinge mechanism signaling said catch mechanism to disengage the striker once said door body is in said intermediate position.

14. A reverse opening vehicle door as described in claim 1 wherein said catch mechanism includes
    an open catch element preventing said catch mechanism from disengaging the striker unless said door body is in said intermediate position;
    a mode cam in communication with said open catch element and said hinge mechanism, said mode cam causing said open catch element to disengage the striker once said door body is in said intermediate position;
    a close cam in communication with said mode cam, said close cam causing said mode cam to exert a closing force on said hinge mechanism when said close cam engages the striker during closing of said door body.

15. A reverse opening vehicle door as described in claim 14 further comprising:
    a linkage element connecting said mode cam to said hinge mechanism, said linkage element providing communication between said mode cam and said hinge mechanism.

16. A reverse opening vehicle door as described in claim 15 wherein said linkage element includes a cable element.

17. A reverse opening vehicle door as described in claim 16 further comprising:
    a spring element positioned between said cable element and said mode cam.

18. A reverse opening vehicle door as described in claim 15 further comprising:
    at least one rotating pivot arm; and
    at least one catch release lever attached to said linkage element, said at least one catch release lever impacting said at least one rotating pivot arm when said door body is moved into said intermediate position, said at least one catch release lever thereby exerting a force through said linkage element to move said mode cam and cause said open catch element to disengage the striker.

19. A reverse opening vehicle door as described in claim 15 further comprising:
    at least one rotating pivot arm; and
    at least one catch release lever attached to said cable element, said at least one catch release lever exerting a closing force on said at least one rotating pivot arm in response to said close cam impacting the striker.

20. A reverse opening vehicle door for use within a door opening of a vehicle comprising:
    a door body having a fore portion and an aft portion;
    a hinge mechanism including at least one rotating pivot arm having a first fixed pivot position and a first free pivot position.

21. A reverse opening vehicle door as described in claim 20 wherein said at least one rotating pivot arm permits said door body to move from a closed position wherein said fore portion is in a fore closed position and said aft portion is in an aft closed position to an intermediate position wherein said aft portion is in an aft intermediate position located outboard and rearward of said aft closed position and said fore portion is in a fore intermediate position located rearward of said fore closed position; and wherein said hinge mechanism permits said fore portion of said door body to rotate about said aft intermediate position to move said door body from said intermediate position to an open position.

22. A reverse opening vehicle door as described in claim 20 wherein said at least one rotating pivot arm is generally arc shaped.

23. A reverse opening vehicle door as described in claim 20 further comprising:

at least one control pivot arm capable of stopping the travel of said at least one rotating pivot arm when said door body reaches an intermediate position.

24. A reverse opening vehicle door as described in claim 23 further comprising:

a control track located within said at least one control pivot arm; and a control pin positioned within said control track, said control pin stopping the travel of said at least one control pivot arm when said door body reaches said intermediate position.

25. A reverse opening vehicle door as described in claim 20 further comprising:

a first mounting structure capable of being mounted on the vehicle; and a second mounting structure mounted on said door body;

wherein said at least one rotating pivot arm is rotatably mounted to said first mounting structure at said first fixed pivot position and is rotatably mounted to said second mounting structure at said first free pivot position.

26. A reverse opening vehicle door as described in claim 20 further comprising:

at least one door stop.

27. A reverse opening vehicle door for use within a door opening of a vehicle, the door opening including a striker positioned on the vehicle, comprising:

a door body having a fore portion and an aft portion;

a catch mechanism including a catch path having a receiving portion and a travel portion;

said receiving portion allowing said catch mechanism to engage the striker from an outboard/inboard direction; and said travel portion allowing said door body to move, while engaging the striker, in a fore/aft direction.

28. A reverse opening vehicle door as described in claim 27 further comprising:

an open catch element preventing said catch mechanism from disengaging the striker unless said door body is in an intermediate position.

29. A reverse opening vehicle door as described in claim 27 wherein said receiving portion is positioned generally perpendicular to the plane of the door opening; and said travel portion is positioned generally parallel to the plane of the door opening.

30. A reverse opening vehicle door as described in claim 27 wherein said catch path is formed into a base element.

31. A reverse opening vehicle door as described in claim 28 further comprising:

a mode cam capable of controlling the position of said open catch element.

32. A reverse opening vehicle door as described in claim 27 wherein said hinge mechanism is mounted to said door body in said door fore portion.

33. A reverse opening vehicle door for use within a door opening of a vehicle, the door opening including a striker positioned on the vehicle, comprising:

a door body having a closed position and an open position; and a catch mechanism positioned on said door body and capable of engaging the striker from an inboard direction when said door body is aft of said closed position;

wherein said catch mechanism is capable of engaging the striker and simultaneously allows said door body to move in a fore/aft direction.

34. A reverse opening vehicle door as described in claim 33 further comprising:

a catch path having a receiving portion and a travel portion;

said receiving portion allowing said catch mechanism to engage the striker from an outboard/inboard direction; and said travel portion allowing said door body to move, while engaging the striker, in a fore/aft direction.

35. A reverse opening vehicle door as described in claim 34 wherein said catch path is formed into a base element.

36. A reverse opening vehicle door as described in claim 33 further comprising:

an open catch element; and a mode cam capable of controlling the position of said open catch element.

37. A reverse opening vehicle door as described in claim 33 further comprising:

a hinge mechanism; and a close cam in communication with said hinge mechanism, said close cam exerting a closing force on said hinge mechanism when said close cam impacts the striker.

38. A method of opening a reverse opening vehicle door comprising:

moving a door body having a fore portion and an aft portion from a closed position, wherein said fore portion is in a fore closed position and said aft portion is in an aft closed position, to an intermediate position, wherein said aft portion is in an aft intermediate position located outboard and rearward of said aft closed position and said fore portion is in a fore intermediate position located rearward of said fore closed position; and moving said door body from said intermediate position to an open position wherein said fore portion is rotated rearward about said aft intermediate position.

39. A method of closing a reverse opening vehicle door comprising:

moving a door body, having a fore portion and an aft portion, from an open position to an intermediate position by rotating said fore portion forward about said aft portion; and moving said door body from said intermediate position, wherein said aft portion is in an aft intermediate position and said fore portion is in a fore intermediate position, to a closed position wherein said aft portion is in an aft closed position located inboard and forward of said aft intermediate position and said fore portion is in a fore closed position located forward of said fore intermediate position.

* * * * *